US012789170B2

(12) United States Patent
Tanaka et al.

(10) Patent No.: US 12,789,170 B2
(45) Date of Patent: Nov. 10, 2026

(54) EXHAUST GAS PURIFICATION CATALYST

(71) Applicant: MITSUI MINING & SMELTING CO., LTD., Tokyo (JP)

(72) Inventors: Hiroki Tanaka, Saitama (JP); Itaru Morita, Saitama (JP); Yuki Nagao, Saitama (JP)

(73) Assignee: Mitsui Kinzoku Company, Limited, Tokyo (JP)

(*) Notice: Subject to any disclaimer, the term of this patent is extended or adjusted under 35 U.S.C. 154(b) by 521 days.

(21) Appl. No.: 18/284,719

(22) PCT Filed: Jan. 17, 2022

(86) PCT No.: PCT/JP2022/001430
§ 371 (c)(1),
(2) Date: Sep. 28, 2023

(87) PCT Pub. No.: WO2022/209155
PCT Pub. Date: Oct. 6, 2022

(65) Prior Publication Data

US 2024/0157339 A1 May 16, 2024

(30) Foreign Application Priority Data

Mar. 31, 2021 (JP) ................................ 2021-061975

(51) Int. Cl.
*B01J 23/46* (2006.01)
*B01J 23/00* (2006.01)
(Continued)

(52) U.S. Cl.
CPC ........... *B01J 23/464* (2013.01); *B01J 23/002* (2013.01); *B01J 23/44* (2013.01); *B01J 23/63* (2013.01); *B01J 35/56* (2024.01)

(58) Field of Classification Search
CPC ........ B01J 23/002; B01J 23/44; B01J 23/464; B01J 23/63; B01J 23/10; B01J 35/56;
(Continued)

(56) References Cited

U.S. PATENT DOCUMENTS 6,047,544 A 4/2000 Yamamoto et al.
2009/0099014 A1 4/2009 Miura
(Continued)

FOREIGN PATENT DOCUMENTS

CN 108698023 A 10/2018
JP 2001079404 A * 3/2001 ............. B01J 23/63
(Continued)

OTHER PUBLICATIONS

English translation of Written Opinion for PCT/JP2022/001430. (Year: 2022).*
(Continued)

*Primary Examiner* — Patricia L. Hailey
(74) *Attorney, Agent, or Firm* — RANKIN, HILL & CLARK LLP

(57) ABSTRACT

An exhaust gas purification catalyst includes a substrate and a catalyst layer provided on the substrate, wherein the catalyst layer includes a first layer containing Rh, and Pd and/or Pt, and a second layer containing Rh, and Pd and/or Pt, wherein a total content of Zr and Ce in terms of oxide and a content of aluminum element in terms of oxide in the first layer are 70% by mass or more and 15% by mass or less, respectively, based on a mass of the first layer, and wherein a content of aluminum element in terms of oxide and a total content of Zr and Ce in terms of oxide in the second layer are 75% by mass or more and 15% by mass or less, respectively, based on a mass of the second layer.

7 Claims, 5 Drawing Sheets

(51) Int. Cl.

| | |
|---|---|
| ***B01J 23/44*** | (2006.01) |
| ***B01J 23/63*** | (2006.01) |
| ***B01J 35/56*** | (2024.01) |

(58) Field of Classification Search

CPC .... B01D 2255/1021; B01D 2255/1023; B01D 2255/1025; B01D 2255/2065; B01D 2255/20715; B01D 2255/2092

USPC .......................................... 502/304, 326, 339

See application file for complete search history.

(56) References Cited

U.S. PATENT DOCUMENTS

| | | | |
|---|---|---|---|
| 2012/0180464 | A1 | 7/2012 | Wei et al. |
| 2014/0205523 | A1 | 7/2014 | Arnold et al. |
| 2018/0178198 | A1 | 6/2018 | Deeba et al. |
| 2019/0015820 | A1 | 1/2019 | Kasuya et al. |
| 2019/0151829 | A1 | 5/2019 | Hoshino et al. |
| 2022/0176352 | A1 | 6/2022 | Ohashi et al. |

FOREIGN PATENT DOCUMENTS

| | | | | | |
|---|---|---|---|---|---|
| JP | 2006205050 | A | * | 8/2006 | ............ B01D 53/86 |
| JP | 2016-505380 | A | | 2/2016 | |
| JP | 2018-527164 | A | | 9/2018 | |
| JP | 2020032306 | A | * | 3/2020 | ............ B01D 53/94 |
| JP | 2020-163342 | A | | 10/2020 | |
| RU | 2008105050 | A | | 8/2009 | |
| WO | 2017/126631 | A1 | | 7/2017 | |

OTHER PUBLICATIONS

Chinese Decision of Rejection dated Apr. 2, 2026 for Chinese Patent Application No. 202280025610.X; English translation.

Zhang et al., "Technology of Low-Precious-Metal Three-Way Catalysts", Metallurgical Industry Press, 2007, total 31 pages; Cited in Decision of Rejection; English translation of p. 13.

International Search Report (ISR) dated Mar. 22, 2022 filed in PCT/JP2022/001430.

* cited by examiner

[FIG. 1]
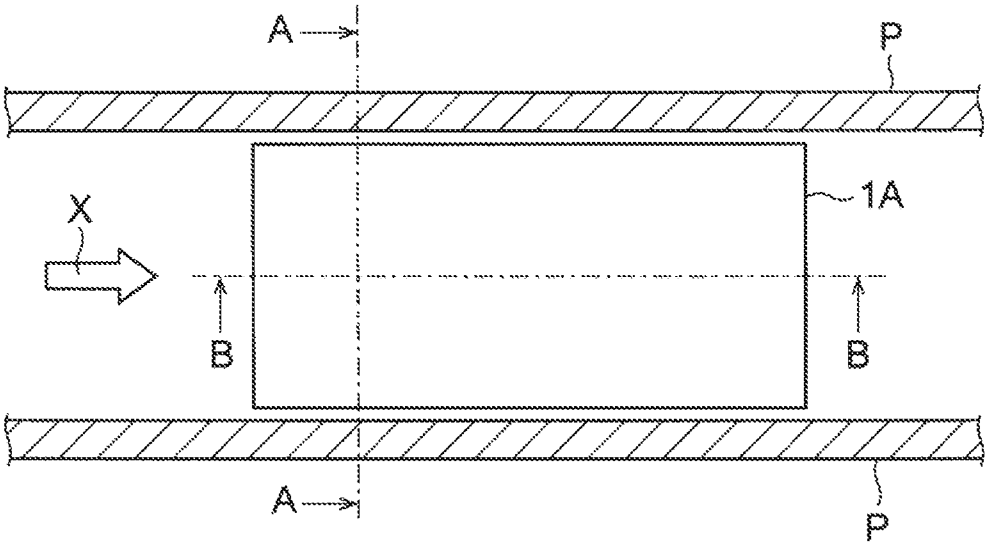

[FIG. 2]
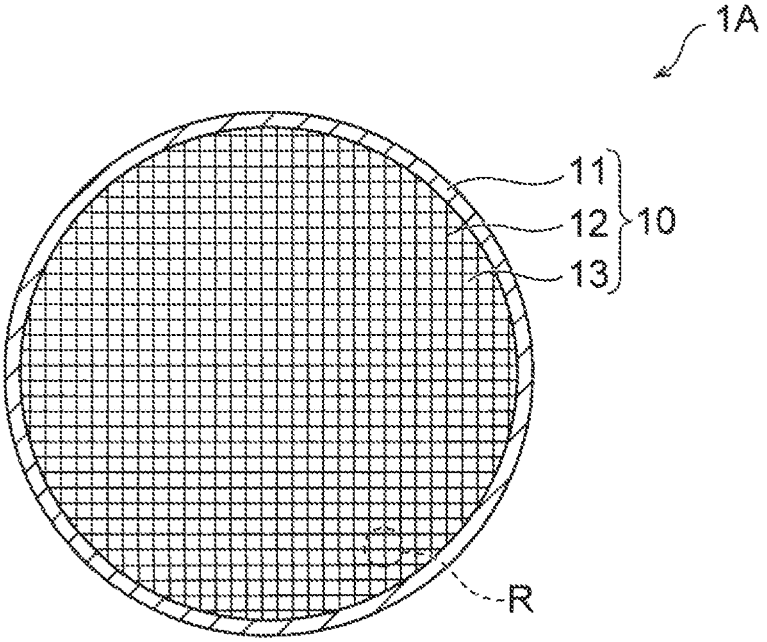

[FIG. 3]
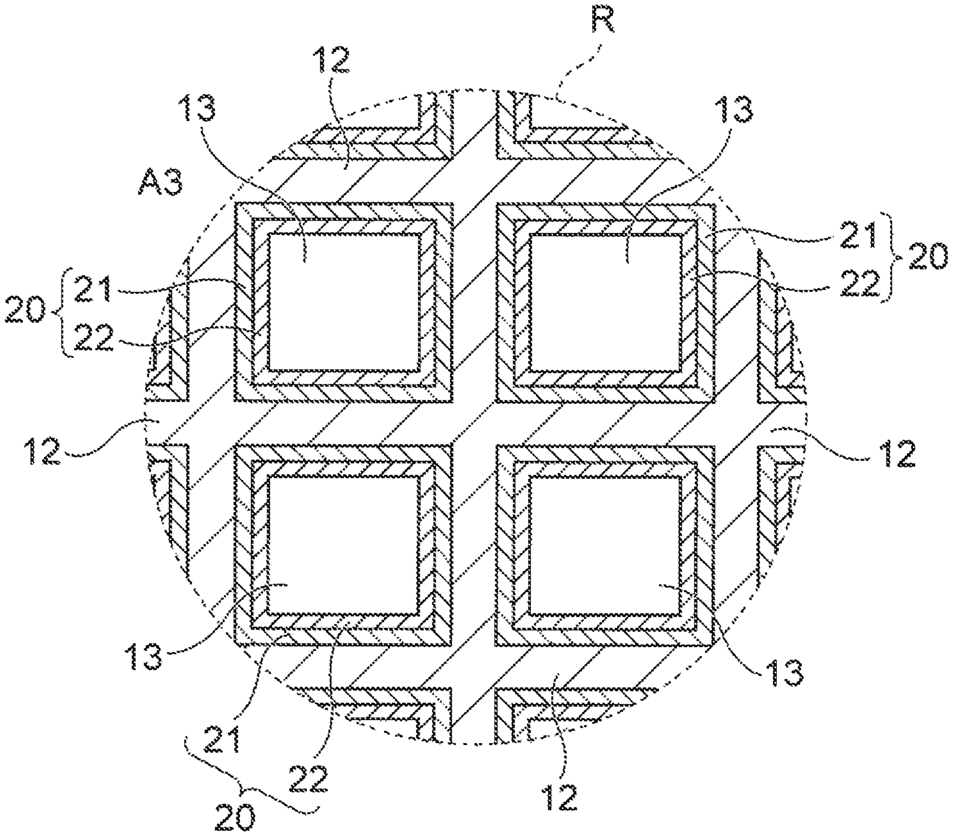

[FIG. 4]
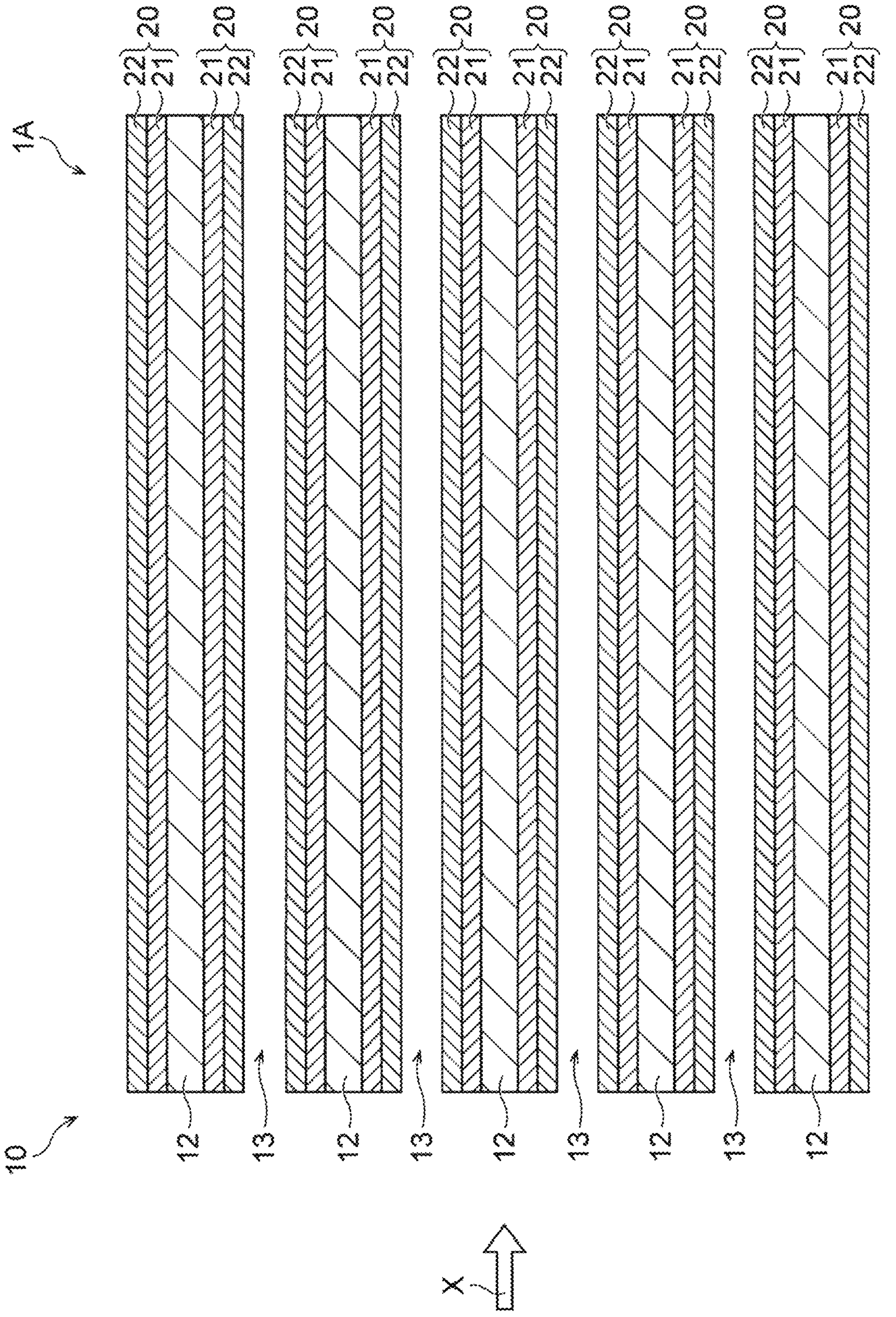

[FIG. 5]
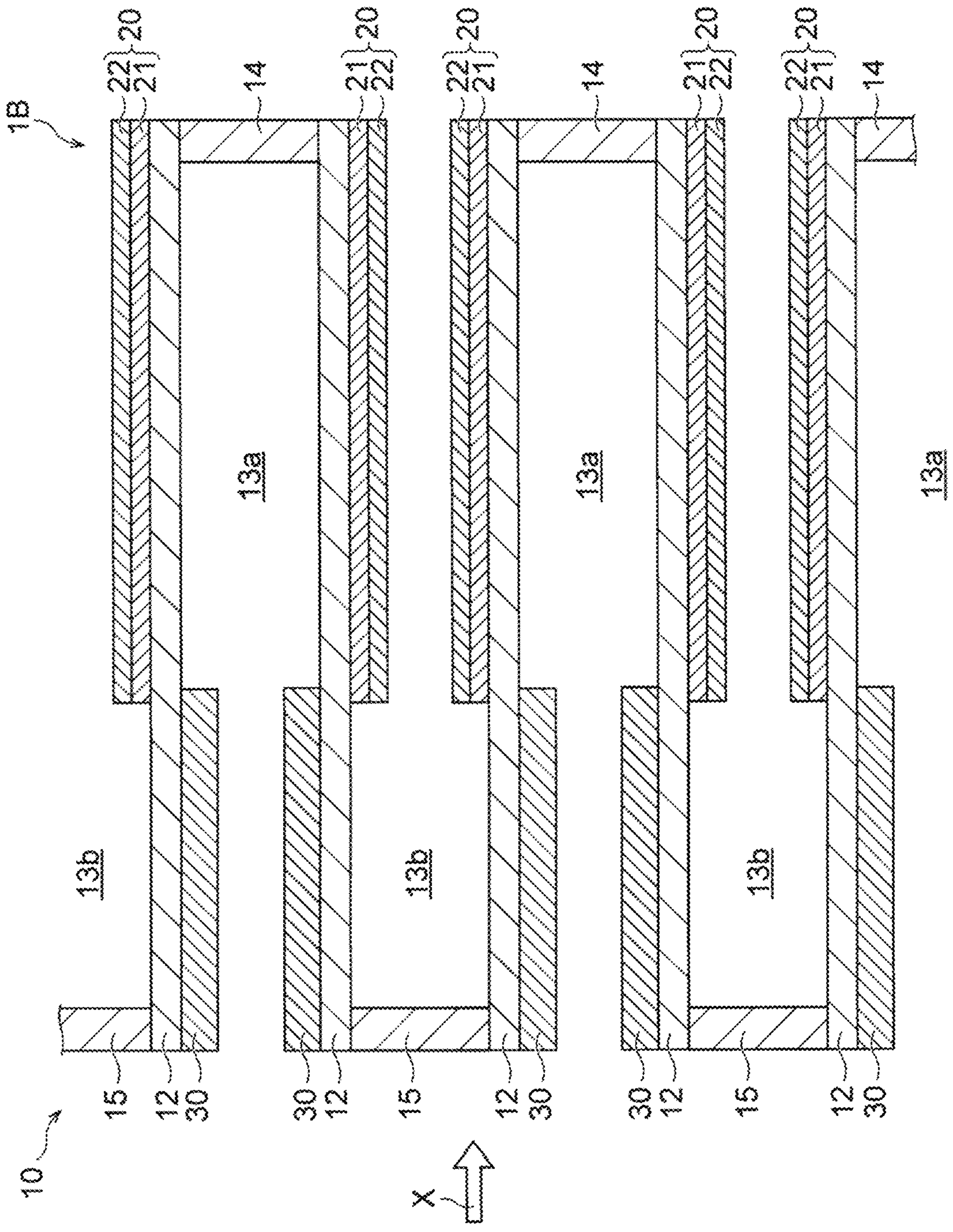

EXHAUST GAS PURIFICATION CATALYST

FIELD OF THE INVENTION

The present invention relates to an exhaust gas purification catalyst.

BACKGROUND ART

Exhaust gas emitted from an internal combustion engine of an automobile, a motorcycle or the like contains harmful components, such as hydrocarbons (HC), carbon monoxide (CO) and nitrogen oxide (NOx). As an exhaust gas purification catalyst that purifies and detoxifies these harmful components, a three-way catalyst having a catalytic activity to oxidize HC and convert it to water and carbon dioxide, to oxidize CO and convert it to carbon dioxide as well as to reduce NOx and convert it to nitrogen, has been used.

In an exhaust gas purification catalyst such as a three-way catalyst, alumina, a complex oxide containing zirconium element (Zr) and cerium element (Ce) (hereafter referred to as "Zr—Ce-based complex oxide"), and the like are used as a support for supporting a catalytically-active component such as platinum element (Pt), palladium element (Pd), or rhodium element (Rh). A Zr—Ce-based complex oxide has an oxygen storage capacity (OSC), and is advantageous in mitigating fluctuations in the oxygen concentration in the exhaust gas and thus expanding the operating window of the catalyst.

Patent Documents 1 and 2 disclose an exhaust gas purification catalyst including a substrate and a catalyst layer provided on the substrate.

The catalyst layer in Patent Document 1 includes a lower layer containing alumina, Pd supported on the alumina, and a Zr—Ce-based complex oxide, and an upper layer containing alumina, Rh supported on the alumina, and a Zr—Ce-based complex oxide.

The catalyst layer in Patent Document 2 contains alumina, Pd supported on the alumina, a Zr—Ce-based complex oxide, and Rh supported on the Zr—Ce-based complex oxide.

CITATION LIST

Patent Document

Patent Document 1: JP 2020-163342 A
Patent Document 2: WO 2017/126631

SUMMARY OF THE INVENTION

The catalyst layer in Patent Document 1 is advantageous in that alloying of Pd in the lower layer and Rh in the upper layer can be suppressed. However, since alumina and a Zr—Ce-based complex oxide are contained in one layer, sintering of the alumina and the Zr—Ce-based complex oxide, migration of Pd supported on the alumina to the Zr—Ce-based complex oxide, migration of Rh supported on the alumina to the Zr—Ce-based complex oxide, and the like may occur under a high-temperature environment, and thus the exhaust gas purification performance may decrease. The same applies to the catalyst layer in Patent Document 2.

Therefore, there is a demand for further improvement in exhaust gas purification performance of an exhaust gas purification catalyst.

Accordingly, an object of the present invention is to provide an exhaust gas purification catalyst with improved exhaust gas purification performance.

In order to solve the above problem, the present invention provides an exhaust gas purification catalyst including:

a substrate; and a catalyst layer provided on the substrate, wherein the catalyst layer includes:

a first layer containing a first platinum group element and a complex oxide containing zirconium element and cerium element; and a second layer containing a second platinum group element and an oxide containing aluminum element, wherein the first platinum group element and the second platinum group element each contain rhodium element, and palladium element and/or platinum element;

wherein, in the first layer, a total of a content of zirconium element in terms of oxide and a content of cerium element in terms of oxide, and a content of aluminum element in terms of oxide are 70% by mass or more and 15% by mass or less, respectively, based on a mass of the first layer; and wherein, in the second layer, a content of aluminum element in terms of oxide, and a total of a content of zirconium element in terms of oxide and a content of cerium element in terms of oxide are 75% by mass or more and 15% by mass or less, respectively, based on a mass of the second layer.

According to the present invention, there is provided an exhaust gas purification catalyst having improved exhaust gas purification performance, particularly exhaust gas purification performance at low-temperature to medium-temperature after being exposed to a high-temperature environment. In the present specification, "low-temperature to medium-temperature" means a temperature of preferably 150° C. or more and less than 400° C., more preferably 200° C. or more and 350° C. or less, and "high-temperature" means a temperature of preferably 400° C. or more, more preferably 450° C. or more.

BRIEF DESCRIPTION OF THE DRAWINGS

FIG. 1 is a partial end view showing a state in which an exhaust gas purification catalyst according to a first embodiment of the present invention is disposed in an exhaust gas path of an internal combustion engine;

FIG. 2 is an end view taken along line A-A of FIG. 1;

FIG. 3 is an enlarged view of a region R in FIG. 2;

FIG. 4 is an end view taken along line B-B of FIG. 1;

FIG. 5 is an end view (end view corresponding to FIG. 4) of an exhaust gas purification catalyst according to a second embodiment of the present invention.

DETAILED DESCRIPTION OF THE INVENTION

Description of Terms

The terms used herein will be described below.

<BET Specific Surface Area>

The BET specific surface area is measured according to JIS R1626, "Measuring methods for the specific surface area of fine ceramic powders by gas adsorption using the BET method," "6.2 Flow method," "(3,5) Single-point method." In this method, a nitrogen-helium gas mixture containing 30% by volume of nitrogen as an adsorption gas and 70% by volume of helium as a carrier gas is used as a gas. "BEL-SORP-MR6" manufactured by MicrotracBEL Corp. is used as a measurement device.

<Group of Platinum Group Elements>

The group of platinum group elements means an element group consisting of platinum element (Pt), palladium element (Pd), rhodium element (Rh), ruthenium element (Ru), osmium element (Os), and iridium element (Ir).

<Rare Earth Element>

Examples of a rare earth element (Ln) include Cerium element (Ce), yttrium element (Y), praseodymium element (Pr), scandium element (Sc), lanthanum element (La), neodymium element (Nd), samarium element (Sm), europium element (Eu), gadolinium element (Gd), terbium element (Tb), dysprosium element (Dy), holmium element (Ho), erbium element (Er), thulium element (Tm), ytterbium element (Yb), lutetium element (Lu) and the like.

<Oxide>

The oxide of aluminum element (Al) means $Al_2O_3$, the oxide of silicon element (Si) means $SiO_2$, the oxide of zirconium element (Zr) means $ZrO_2$, the oxide of chromium element (Cr) means $Cr_2O_3$, the oxide of boron (B) means $B_2O_3$, the oxide of magnesium element (Mg) means MgO, the oxide of calcium element (Ca) means CaO, the oxide of strontium element (Sr) means SrO, the oxide of barium element (Ba) means BaO. The oxide of rare earth element (Ln) means a sesquioxide ($Ln_2O_3$) except the oxide of Ce, the oxide of Pr, and the oxide of Tb, where the oxide of Ce means $CeO_2$, the oxide of Pr means $Pr_6O_{11}$, and the oxide of Tb means $Tb_4O_7$.

<Oxide Containing Aluminum Element (A1-Based Oxide)>

An Al-based oxide is used as a support for a catalytically-active component. An Al-based oxide is distinct from alumina used as a binder ("alumina binder"). An Al-based oxide is, for example, particulate. From the viewpoint of improving the supportability for a catalytically-active component, an Al-based oxide is preferably porous. The BET specific surface area of an Al-based oxide is preferably 50 $m^2/g$ or more and 300 $m^2/g$ or less, more preferably 80 $m^2/g$ or more and 200 $m^2/g$ or less.

An Al-based oxide may or may not contain an element other than Al and O.

An Al-based oxide according to one embodiment (hereinafter referred to as "first Al-based oxide") does not contain an element other than Al and O. That is, the first Al-based oxide is alumina.

An Al-based oxide according to another embodiment (hereinafter referred to as "second Al-based oxide") contains one or more types of elements other than Al and O. Examples of the second Al-based oxide include an oxide obtained by modifying the surface of alumina with an element other than Al and O and an oxide obtained by dissolving an element other than Al and O in alumina.

An element other than Al and O may be a non-metal element or a metal element. Examples of such a non-metal element include B and Si, and examples of such a metal element include Zr, Cr, Ln (e.g., Ce, La, and Nd), Mg, Ca, Sr, and Ba. From the viewpoint of improving the heat resistance of the second Al-based oxide, an element other than Al and O is preferably selected from La, Ce, Sr, and Ba.

Examples of the second Al-based oxide include alumina-silica, alumina-silicate, alumina-zirconia, alumina-chromic, alumina-cerin, and alumina-lanthana.

In the second Al-based oxide, an element other than Al and O may form a solid solution phase with Al and O, may form a single phase (for example, an oxide phase of an element other than Al and O) which is a crystalline phase or an amorphous phase, or may form both a solid solution phase and a single phase.

In the second Al-based oxide, the content of Al in terms of oxide is preferably 80% by mass or more and 99.9% by mass or less, more preferably 90% by mass or more and 99.8% by mass or less, and still more preferably 95% by mass or more and 99.5% by mass or less, based on the mass of the second Al-based oxide, from the viewpoint of improving the heat resistance.

In the second Al-based oxide, the content of an element other than Al and O in terms of oxide is preferably 0.1% by mass or more and 20% by mass or less, more preferably 0.2% by mass or more and 10% by mass or less, and still more preferably 0.5% by mass or more and 5% by mass or less, based on the mass of the second Al-based oxide, from the viewpoint of improving the heat resistance. "The content of an element other than Al and O in terms of oxide" means, in a case where the second Al-based oxide contains two or more types of elements other than Al and O, the total content of the two or more types of elements in terms of oxide, <Complex Oxide Containing Zirconium Element and Cerium Element (Zr—Ce-Based Complex Oxide)>

A Zr—Ce-based complex oxide is used as a support for a catalytically-active component. A Zr—Ce-based complex oxide is, for example, particulate. From the viewpoint of improving the supportability for a catalytically-active component, a Zr—Ce-based complex oxide is preferably porous. The BET specific surface area of a Zr—Ce-based complex oxide is preferably 20 $m^2/g$ or more and 120 $m^2/g$ or less, more preferably 30 $m^2/g$ or more and 80 $m^2/g$ or less.

In a Zr—Ce-based complex oxide, Zr may form a solid solution phase with Ce and O, may form a single phase (for example, a single phase of $ZrO_2$) which is a crystalline phase or an amorphous phase, or may form both a solid solution phase and a single phase, but it is preferable that at least part of Zr forms a solid solution phase.

In a Zr—Ce-based complex oxide, Ce may form a solid solution phase with Zr and O, may form a single phase (for example, a single phase of $CeO_2$) which is a crystalline phase or an amorphous phase, or may form both a solid solution phase and a single phase, but it is preferable that at least part of Ce forms a solid solution phase.

Zr mainly contributes to the improvement of the heat resistance of a Zr—Ce-based complex oxide, and Ce mainly contributes to the improvement of oxygen storage capacity of a Zr—Ce-based complex oxide.

In a Zr—Ce-based complex oxide, the total of the content of Zr in terms of oxide and the content of Ce in terms of oxide is preferably 60% by mass or more, more preferably 70% by mass or more, and still more preferably 80% by mass or more, based on the mass of the Zr—Ce-based complex oxide, from the viewpoint of improving the heat resistance and the oxygen storage capacity. The upper limit is 100% by mass.

In a Zr—Ce-based complex oxide, the mass ratio of the amount of Ce in terms of oxide to the total of the amount of Zr in terms of oxide and the amount of Ce in terms of oxide is preferably 0,001 or more and 0.9 or less, more preferably 0.05 or more and 0.7 or less, and still more preferably 0.1 or more and 0.6 or less, from the viewpoint of balancing the heat resistance and oxygen storage capacity.

A Zr—Ce-based complex oxide may contain one or more types of Ln other than Ce, or may not contain Ln other than Ce.

Ln other than Ce is preferably selected from La, Nd, Pr, Y, Gd, and Sm, and more preferably selected from La, Nd, Pr, and Y, from the viewpoint of improving the heat resistance.

In a case where a Zr—Ce-based complex oxide contains Ln other than Ce, Ln other than Ce may form a solid solution phase with Zr and/or Ce and O, may form a single phase (for example, an oxide single phase of Ln other than Ce) which is a crystalline phase or an amorphous phase, or may form both a solid solution phase and a single phase, but it is preferable that at least part of Ln other than Ce forms a solid solution phase.

In a case where a Zr—Ce-based complex oxide contains Ln other than Ce, the content of Ln other than Ce in terms of oxide in the Zr—Ce-based complex oxide is preferably 1% by mass or more and 40% by mass or less, more preferably 3% by mass or more and 30% by mass or less, and still more preferably 5% by mass or more and 20% by mass or less, based on the mass of the Zr—Ce-based complex oxide, from the viewpoint of improving the heat resistance. "The content of Ln other than Ce in terms of oxide" means, in a case where a Zr—Ce-based complex oxide contains two or more types of Ln other than Ce, the total content of the two or more types of Ln in terms of oxide.

A Zr—Ce-based complex oxide may contain one or more types of alkali metal elements. Such an alkaline earth metal element is preferably selected from Ca, Sr, and Ba from the viewpoint of improving the co-catalyst effect for a platinum group element.

In a Zr—Ce-based complex oxide, the content of an alkaline earth metal element in terms of oxide is preferably 0.1% by mass or more and 10% by mass or less, more preferably 0.2% by mass or more and 5% by mass or less, and still more preferably 0.5% by mass or more and 3% by mass or less, based on the mass of the Zr—Ce complex oxide, from the viewpoint of improving the co-catalyst effect for a platinum group element. "The content of an alkaline earth metal element in terms of oxide" means, in a case where a Zr—Ce-based complex oxide contains two or more types of alkaline earth metal elements, the total content of the two or more types of alkaline earth metal elements in terms of oxide.

<Binder>

Examples of a binder include inorganic binders such as alumina, zirconia, titania, silica, and ceria.

<Content of Al in Terms of Oxide>

When calculating the content of Al in terms of oxide in a layer, an Al source is not particularly limited as long as the Al source is an oxide containing Al. Examples of such an Al source include an Al-based oxide and an alumina binder.

The content of Al in terms of oxide in a layer means, in a case where the layer contains one type of Al source, the content of Al in terms of oxide derived from the one type of Al source, and means, in a case where the layer contains two or more types of Al sources, the total content of Al in terms of oxide derived from the two or more types of Al sources.

<Content of Zr or Ce in Terms of Oxide>

When calculating the content of Zr in terms of oxide in a layer, a Zr source is not particularly limited as long as the Zr source is an oxide containing Zr. Examples of such a Zr source include a Zr—Ce-based complex oxide, an Al-based oxide containing Zr, and a zirconia binder.

The content of Zr in terms of oxide in a layer means, in a case where the layer contains one type of Zr source, the content of Zr in terms of oxide derived from the one type of Zr source, and means, in a case where the layer contains two or more types of Zr sources, the total content of Zr in terms of oxide derived from the two or more types of Zr sources.

When calculating the content of Ce in terms of oxide in a layer, a Ce source is not particularly limited as long as the Ce source is an oxide containing Ce. Examples of such a Ce source include a Zr—Ce-based complex oxide, an Al-based oxide containing Ce, and a cerin binder. A Ce source need not be a different oxide from a Zr source, and may be the same oxide as a Zr source. For example, a Zr—Ce-based complex oxide corresponds to both a Ce source and a Zr source. Further, an Al-based oxide containing Zr and Ce corresponds to both a Ce source and a Zr source.

The content of Ce in terms of oxide in a layer means, in a case where the layer contains one type of Ce source, the content of Ce in terms of oxide derived from the one type of Ce source, and means, in a case where the layer contains two or more types of Ce sources, the total content of Ce in terms of oxide derived from the two or more types of Ce sources.

The content of each element in terms of oxide in a layer can be measured, for example, using a scanning electron microscope-energy dispersive X-ray spectrometer (SEM-EDX).

<<Exhaust Gas Purification Catalyst>>

An exhaust gas purification catalyst of the present invention will be described below.

First Embodiment

An exhaust gas purification catalyst 1A according to a first embodiment of the present invention will be described below with reference to FIGS. 1 to 4.

As shown in FIG. 1, the exhaust gas purification catalyst 1A is disposed in an exhaust gas path in an exhaust pipe P of an internal combustion engine. The internal combustion engine is, for example, a gasoline engine. Exhaust gas emitted from the internal combustion engine flows through the exhaust gas path in the exhaust pipe P from one end to the other end of the exhaust pipe P, and is purified by the exhaust gas purification catalyst 1A provided in the exhaust pipe P. In each drawing, the exhaust gas flow direction is denoted by the reference sign X. The upstream position in the exhaust gas flow direction X is referred to as the "exhaust gas inflow side," and the downstream position in the exhaust gas flow direction X is referred to as the "exhaust gas outflow side," in some cases.

In addition to the exhaust gas purification catalyst 1A, another exhaust gas purification catalyst may be disposed in the exhaust gas path in the exhaust pipe P. For example, the exhaust gas purification catalyst 1A may be disposed upstream in the exhaust gas path in the exhaust pipe P, and another exhaust gas purification catalyst may be disposed downstream in the exhaust gas path in the exhaust pipe P. Examples of another exhaust gas purification catalyst include an exhaust gas purification catalyst 1B, which will be described later.

As shown in FIGS. 2 to 4, the exhaust gas purification catalyst 1A includes a substrate 10 and a catalyst layer 20 provided on the substrate 10.

The substrate 10 can be made of any material selected as appropriate from materials commonly used for substrates of exhaust gas purification catalysts. The material for forming the substrate 10 is preferably a material that allows the substrate 10 to stably maintain its shape even when the substrate 10 is exposed to an exhaust gas at a high temperature, for example, 400° C. or more. Examples of a material for the substrate 10 include: ceramics such as cordierite, silicon carbide (SiC), and aluminum titanate; and alloys such as stainless steel.

The substrate 10 has, for example, a honeycomb structure.

As shown in FIGS. 2 to 4, the substrate 10 includes a tubular member 11 that defines the external shape of the substrate 10, a partition wall 12 provided in the tubular member 11, and cells 13 separated from each other by the partition wall 12.

As shown in FIG. 2, the tubular member 11 has, for example, a hollow cylindrical shape, but may have another shape such as a hollow elliptic cylindrical shape and a polygonal tubular shape.

As shown in FIGS. 2 to 4, the partition wall 12 is present between adjacent cells 13, whereby the adjacent cells 13 are separated from each other by the partition wall 12. The partition wall 12 is preferably porous. The thickness of the partition wall 12 is, for example, 20 μm or more and 1500 μm or less.

As shown in FIG. 4, each cell 13 extends in the exhaust gas flow direction X and has an end on the exhaust gas inflow side and an end on the exhaust gas outflow side.

As shown in FIG. 4, the end on the exhaust gas inflow side and the end of the exhaust gas outflow side of each cell 13 are both open. Therefore, the exhaust gas that has flowed in from the end (opening) on the exhaust gas inflow side of each cell 13 flows out from the end (opening) on the exhaust gas outflow side of each cell 13. Such a mode is called a flow-through type.

As shown in FIGS. 2 and 3, the shape in a plan view of the end (opening) on the exhaust gas inflow side of each cell 13 is rectangle, but may be other shapes such as hexagon and octagon. The shape in a plan view of the end (opening) on the exhaust gas outflow side of each cell 13 is also the same.

The cell density per square inch of the substrate 10 is, for example, 200 cells or more and 1000 cells or less. The cell density per square inch of the substrate 10 means the total number of the cells 13 per square inch in a cross-section obtained by cutting the substrate 10 by a plane perpendicular to the exhaust gas flow direction X.

The volume of the substrate 10 is, for example, 0.1 L or more and 20 L or less. The volume of substrate 10 means the apparent volume of substrate 10. In a case where the substrate 10 is in the form of a cylinder, and the outer diameter of the substrate 10 is 2r and the length of the substrate 10 is L, the volume of the substrate 10 is represented by the formula: Volume of substrate 10=$\pi \times r^2 \times L$.

As shown in FIG. 4, the catalyst layer 20 is provided on the partition wall 12 of the substrate 10. The catalyst layer 20 may be provided directly on the partition wall 12, or may be provided on the partition wall 12 via another layer.

As shown in FIG. 4, the catalyst layer 20 extends from the end on the exhaust gas inflow side of the partition wall 12 to the end on the exhaust gas outflow side of the partition wall 12 along the exhaust gas flow direction X. The catalyst layer 20 may extend from the end on the exhaust gas inflow side of the partition wall 12 so as not to reach the end on the exhaust gas outflow side of the partition wall 12 along the exhaust gas flow direction X, or may extend from the end on the exhaust gas outflow side of the partition wall 12 along the direction opposite to the exhaust gas flow direction X so as not to reach the end of the exhaust gas inflow side of the partition wall 12.

From the viewpoint of balancing the temperature rise and the purification performance of the catalyst, the mass (mass after drying and calcining) of the catalyst layer 20 per unit volume of the substrate 10 is preferably 50 g/L or more and 500 g/L or less, more preferably 70 g/L. or more and 400 g/L or less, and still more preferably 90 g/L or more and 300 g/L or less.

As shown in FIG. 4, the catalyst layer 20 includes a first layer 21 and a second layer 22.

The catalyst layer 20 may include another layer in addition to the first layer 21 and the second layer 22, but preferably consists of the first layer 21 and the second layer 22 from the viewpoint of production efficiency.

As shown in FIG. 4, the first layer 21 is located between the substrate 10 and the second layer 22. That is, the second layer 22 is provided on the upper side of the first layer 21. The expression "the second layer 22 is provided on the upper side of the first layer 21" means that part or all of the second layer 22 is present on, of two main surfaces of the first layer 21, the main surface opposite to the main surface on the partition wall 12 side of the substrate 10. "The main surface of the first layer 21" means the outer surface of the first layer 21 that extends in the exhaust gas flow direction X. The second layer 22 may be provided directly on the main surface of the first layer 21, or may be provided via another layer. The first layer 21 may be provided directly on the partition wall 12, or may be provided on the partition wall 12 via another layer.

The second layer 22 may be provided on the lower side of the first layer 21. The expression "the second layer 22 is provided on the lower side of the first layer 21" means that part or all of the first layer 21 is present on, of two main surfaces of the second layer 22, the main surface opposite to the main surface on the partition wall 12 side of the substrate 10. "The main surface of the second layer 22" means the outer surface of the second layer 22 that extends in the exhaust gas flow direction X. The first layer 21 may be provided directly on the main surface of the second layer 22, or may be provided via another layer.

<First Layer>

The first layer 21 will be described below.

The first layer 21 contains a first platinum group element and a complex oxide containing zirconium element and cerium element (Zr—Ce-based complex oxide).

The first layer 21 may contain one type of Zr—Ce-based complex oxide, or may contain two or more types of Zr—Ce-based complex oxides.

The first layer 21 may or may not contain an oxide containing aluminum element (Al-based oxide). The first layer 21 may contain one type of Al-based oxide, or may contain two or more types of Al-based oxides.

The first layer 21 may or may not contain barium element (Ba). Examples of a Ba source include barium carbonate, barium oxide, barium aluminate, and barium zirconate. The Ba source may be an Al-based oxide containing Ba, a Zr—Ce-based complex oxide containing Ba, or the like.

The first platinum group element includes rhodium element (Rh), and palladium element (Pd) and/or platinum element (Pt). As a result, the exhaust gas purification performance can be improved more than in a case where the first platinum group element is composed of one type of element. The first platinum group element may contain an element other than Rh, Pd and Pt selected from the group of platinum group elements.

In one embodiment, the first platinum group element is composed of Rh and Pd. In another embodiment, the first platinum group element is composed of Rh and Pt.

The first platinum group element is contained in the first layer 21 in a form that can function as a catalytically-active component, for example, in the form of a metal, an alloy, a compound (for example, an oxide), or the like. From the viewpoint of improving exhaust gas purification performance, a catalytically-active component containing the first platinum group element is preferably in the form of a particle.

A catalytically-active component containing the first platinum group element is preferably supported on the Zr—Ce-based complex oxide. "Supported" means a state in which the catalytically-active component containing the first platinum group element is physically or chemically adsorbed or retained on the outer surface or inner surface of pores of the Zr—Ce-based complex oxide. For example, SEM-EDX can be used to confirm that the catalytically-active component containing the first platinum group element is supported on the Zr—Ce-based complex oxide.

In a case where the first layer 21 contains an Al-based oxide, a catalytically-active component containing the first platinum group element may be supported on the Al-based oxide. The meaning of support and the confirmation method that the catalytically-active component is being supported are the same as described above.

From the viewpoint of balancing the exhaust gas purification performance and the cost, the content of the first platinum group element in the first layer 21 is preferably 0.01% by mass or more and 10% by mass or less, more preferably 0.05% by mass or more and 7.5% by mass or less, and still more preferably 0.1% by mass or more and 5.0% by mass or less, based on the mass of the first layer 21. The content of the first platinum group element means the total content of two or more types of elements constituting the first platinum group element. The mass of the first platinum group element means the mass in terms of metal.

In the first layer 21, the mass ratio of the total amount of Pd and Pt to the amount of Rh is preferably 1 or more and less than 10, more preferably 1.5 or more and 9 or less, and still more preferably 2 or more and 8 or less. This can improve the catalytic activity of Rh. The total content of Pd and Pt means the total content of Pd and Pt in a case where the first layer 21 contains Pd and Pt, means the content of Pd in a case where the first layer 21 contains Pd but does not contain Pt, and means the content of Pt in a case where the first layer 21 contains Pt but does not contain Pd.

In the first layer 21, the total of the content of Zr in terms of oxide and the content of Ce in terms of oxide is preferably 70% by mass or more, more preferably 75% by mass or more, still more preferably 80% by mass or more, based on the mass of the first layer 21, and the content of Al in terms of oxide is preferably 15% by mass or less, more preferably 12% by mass or less, still more preferably 8% by mass or less, based on the mass of the first layer 21. In the first layer 21, of the total of the mass of Zr in terms of oxide and the mass of Ce in terms of oxide, the proportion of the total of the mass of Zr in terms of oxide and the mass of Ce in terms of oxide, derived from the Zr—Ce-based complex oxide, is preferably 60% by mass or more, more preferably 70% by mass or more, and still more preferably 90% by mass or more. The upper limit of the proportion is 100% by mass. Therefore, in the first layer 21, the amount of the Zr—Ce-based complex oxide is significantly larger than the amount of the Al-based oxide. As a result, under a high-temperature environment, the decrease in exhaust gas purification performance due to sintering of the Zr—Ce-based complex oxide and Al-based oxide and the decrease in exhaust gas purification performance due to migration of the first platinum group element supported on the Zr—Ce-based complex oxide to the Al-based oxide can be suppressed, and thus the exhaust gas purification performance can be improved. In particular, the exhaust gas purification performance at low-temperature to medium-temperature after being exposed to a high-temperature environment can be improved.

From the viewpoint of ensuring the amounts of other components such as a platinum group element and a co-catalyst component, the total of the content of Zr in terms of oxide and the content of Ce in terms of oxide in the first layer 21 is preferably 99.9% by mass or less, more preferably 99% by mass or less, and still more preferably 95% by mass or less, based on the mass of the first layer 21. Each of these upper limit values may be combined with any of the above lower limit values.

The lower limit of the content of Al in terms of oxide in the first layer 21 is zero. The content of Al in terms of oxide in the first layer 21 may be, for example, 7% by mass or more, 5% by mass or more, or 1% by mass or more, based on the mass of the first layer 21. These lower limit values may be combined with any of the above upper limit values.

From the viewpoint of balancing the heat resistance and the oxygen storage capacity, the mass ratio of the amount of Ce in terms of oxide to the total of the amount of Zr in terms of oxide and the amount of Ce in terms of oxide in the first layer 21 is preferably 0.001 or more and 0.8 or less, more preferably 0.01 or more and 0.7 or less, and still more preferably 0.05 or more and 0.6 or less.

The first layer 21 may contain the first Zr—Ce-based complex oxide and the second Zr—Ce-based complex oxide.

It is preferable that the content of Ce in terms of oxide in the second Zr—Ce-based complex oxide is higher than the content of Ce in terms of oxide in the first Zr—Ce-based complex oxide.

In a case where the first platinum group element contains Rh and Pd, Rh is preferably supported on the first Zr—Ce-based complex oxide and Pd is supported on the second Zr—Ce-based complex oxide. As a result, alloying of Rh and Pd can be suppressed, and the catalytic activity of Rh and the catalytic activity of Pd can be improved. Thus, the exhaust gas purification performance can be further improved.

From the viewpoint of sufficiently bringing out the catalytic activity of the platinum group element (for example, Rh) supported on the first Zr—Ce-based complex oxide, the content of Ce in terms of oxide in the first Zr—Ce-based complex is preferably 0.1% by mass or more and less than 30% by mass, more preferably 1% by mass or more and 26% by mass or less, and still more preferably 5% by mass or more and 22% by mass or less, based on the mass of the first Zr—Ce-based complex oxide.

From the viewpoint of sufficiently bringing out the catalytic activity of the platinum group element (for example, Pd) supported on the second Zr—Ce-based complex oxide, the content of Ce in terms of oxide in the second Zr—Ce-based complex is preferably 30% by mass or more and 80% by mass or less, more preferably 34% by mass or more and 70% by mass or less, and still more preferably 38% by mass or more and 60% by mass or less, based on the mass of the second Zr—Ce-based complex oxide.

From the viewpoint of achieving both the increase in the oxygen storage amount and the co-catalyst effect for the platinum group element, of the total of the mass of Zr in terms of oxide and the mass of Ce in terms of oxide in the first layer 21, the proportion of the total of the mass of Zr in terms of oxide and the mass of Ce in terms of oxide, derived from the first Zr—Ce-based complex oxide, is preferably 5% by mass or more and 95% by mass or less, more preferably 10% by mass or more and 90% by mass or less, still more preferably 20% by mass or more and 80% by mass or less.

From the viewpoint of achieving both the increase in the oxygen storage amount and the co-catalyst effect for the platinum group element, of the total of the mass of Zr in terms of oxide and the mass of Ce in terms of oxide in the first layer 21, the proportion of the total of the mass of Zr in terms of oxide and the mass of Ce in terms of oxide, derived from the second Zr—Ce-based complex oxide, is preferably 5% by mass or more and 95% by mass or less, more preferably 10% by mass or more and 90% by mass or less, still more preferably 20% by mass or more and 80% by mass or less.

Preferably, the first layer 21 is substantially free of an Al-based oxide. This can suppress sintering of the Zr—Ce-based complex oxide due to Al, and can further improve the exhaust gas purification performance. The "substantially free of an Al-based oxide" means that the content of Al in terms of oxide in the first layer 21 is preferably 15% by mass or less, more preferably 5% by mass or less, and still more preferably 1% by mass or less, based on the mass of the first layer 21. The lower limit is zero.

Preferably, the first layer 21 is substantially free of Ba. This can suppress sintering of the Zr—Ce-based complex oxide due to Ba, and can further improve the exhaust gas purification performance. The "substantially free of Ba" means that the content of Ba in terms of metal in the first layer 21 is preferably 5% by mass or less, more preferably 3% by mass or less, and still more preferably 1% by mass or less, based on the mass of the first layer 21. The lower limit is zero.

<Second Layer>

The second layer 22 will be described below.

The second layer 22 contains a second platinum group element and an oxide containing aluminum element (Al-based oxide).

The second layer 22 may contain one type of Al-based oxide, or may contain two or more types of Al-based oxides.

The second layer 22 may or may not contain a complex oxide containing zirconium element and cerium element (Zr—Ce-based complex oxide). The second layer 22 may contain one type of Zr—Ce-based complex oxide, or may contain two or more types of Zr—Ce-based complex oxides.

The second layer 22 may or may not contain barium element (Ba). Examples of a Ba source include barium carbonate, barium oxide, barium nitrate, barium aluminate, and barium zirconate. The Ba source may be an Al-based oxide containing Ba, a Zr—Ce-based complex oxide containing Ba, or the like.

The second platinum group element includes rhodium element (Rh), and palladium element (Pd) and/or platinum element (Pt). As a result, the exhaust gas purification performance can be improved more than in a case where the second platinum group element is composed of one type of element. The second platinum group element may contain an element other than Rh, Pd and Pt selected from the group of platinum group elements.

In one embodiment, the second platinum group element is composed of Rh and Pd. In another embodiment, the second platinum group element is composed of Rh and Pt.

The second platinum group element is contained in the second layer 22 in a form that can function as a catalytically-active component, for example, in the form of a metal, an alloy, a compound (for example, an oxide), or the like, From the viewpoint of improving exhaust gas purification performance, a catalytically-active component containing the second platinum group element is preferably in the form of a particle.

A catalytically-active component containing the second platinum group element is preferably supported on the Al-based complex oxide. In a case where the second layer 22 contains a Zr—Ce-based complex oxide, the catalytically-active component containing the second platinum group element may be supported on the Zr—Ce-based complex oxide. The meaning of support and the confirmation method that the catalytically-active component is being supported are the same as described above.

From the viewpoint of balancing the exhaust gas purification performance and the cost, the content of the second platinum group element in the second layer 22 is preferably 0.01% by mass or more and 10% by mass or less, more preferably 0.05% by mass or more and 7.5% by mass or less, and still more preferably 0.1% by mass or more and 5.0% by mass or less, based on the mass of the second layer 22, The content of the second platinum group element means the total content of two or more types of elements constituting the second platinum group element. The mass of the second platinum group element means the mass in terms of metal.

The mass ratio of the total amount of Pd and Pt to the amount of Rh in the second layer 22 is preferably 1 or more and less than 10, more preferably 1.5 or more and 9 or less, and still more preferably 2 or more and 8 or less. This can improve the catalytic activity of Rh. The total content of Pd and Pt means the total content of Pd and Pt in a case where the second layer 22 contains Pd and Pt, means the content of Pd in a case where the second layer 22 contains Pd but does not contain Pt, and means the content of Pt in a case where the second layer 22 contains Pt but does not contain Pd.

The total content of the second platinum group element in the second layer 22 is preferably higher than the total content of the first platinum group element in the first layer 21. The Al-based oxide contained in the second layer 22 can support a platinum group element with better dispersibility than the Zr—Ce-based complex oxide contained in the first layer 21. Thus, in a case where the total content of the second platinum group element in the second layer 22 is higher than the total content of the first platinum group element in the first layer 21, the exhaust gas purification performance can be further improved.

In a case where the total content of the second platinum group element in the second layer 22 is higher than the total content of the first platinum in the first layer 21, the second layer 22 is preferably provided on the upper side of the first layer 21, This can improve the contact efficiency between the second platinum group element contained in the second layer 22, and the exhaust gas, and thus can further improve the exhaust gas purification performance.

In a case where the second layer 22 is provided on the upper side the first layer 21, the second layer 22 is preferably the outermost layer of the catalyst layer 20, This can improve the contact efficiency between the second platinum group element contained in the second layer 22, and the exhaust gas, and thus can further improve the exhaust gas purification performance. The "outermost layer" means a layer forming one of two main surfaces of the catalyst layer 20 opposite to the main surface on the partition wall 12 side of the substrate 10.

In the second layer 22, the content of Al in terms of oxide is preferably 75% by mass or more, more preferably 80% by mass or more, still more preferably 85% by mass or more, based on the mass of the second layer 22, and the total of the content of Zr in terms of oxide and the conte of Ce in terms of oxide is preferably 15% by mass or less, more preferably 5% by mass or less, still more preferably 1% by mass or less, based on the mass of the second layer 22. Of the total amount of Al in terms of oxide in the second layer 22, the proportion of the amount of Al in terms of oxide derived from the Al-based oxide is preferably 60% by mass or more, more preferably 70% by mass or more, and still more preferably 90% by mass or more. The upper limit of the proportion is 100% by mass. Therefore, in the second layer 22, the amount of the Al-based oxide is significantly larger than the amount of the Zr—Ce-based complex oxide. As a result, under a high-temperature environment, the decrease in exhaust gas purification performance due to sintering of the Al-based oxide and the Zr—Ce-based complex oxide and the decrease in exhaust gas purification performance due to migration of the second platinum group element supported on the Al-based complex oxide to the Zr—Ce-based complex oxide can be suppressed, and thus the exhaust gas purification performance can be improved. In particular, the exhaust gas purification performance at low-temperature to medium-temperature after being exposed to a high-temperature environment can be improved.

From the viewpoint of ensuring the amounts of other components such as a platinum group element and a co-catalyst component, the content of Al in terms of oxide in the second layer 22 is preferably 99.9% by mass or less, more preferably 99% by mass or less, and still more preferably 95% by mass or less, based on the mass of the second layer 22. Each of these upper limit values may be combined with any of the above lower limit values.

The lower limit of the total of the content of Zr in terms of oxide and the content of Ce in terms of oxide in the second layer 22 is zero. The total of the content of Zr in terms of oxide and the content of Ce in terms of oxide in the second layer 22 may be, for example, 1% by mass or more, 5% by mass or more, or 10% by mass or more, based on the mass of the second layer 22. Each of these lower limit values may be combined with any of the above upper limit values.

In a case where the second layer 22 contains Ba, from the viewpoint of maximizing the co-catalyst effect of Ba, the content of Ba in the second layer 22 is preferably 0.1% by mass or more and 20% by mass or less, more preferably 1% by mass or more and 15% by mass or less, and still more preferably 3% by mass or more and 12% by mass or less, based on the mass of the second layer 22.

A method for forming the catalyst layer 20 will be described below.

A substrate 10, a slurry for forming the first layer 21, and a slurry for forming the second layer 22 are prepared.

The compositions of the slurries for forming the first layer 21 and the second layer 22 are adjusted depending on the compositions of the first layer 21 and the second layer 22, respectively. The slurry contains, for example, a platinum group element supply source, an Al-based oxide, a Zr—Ce-based complex oxide, a Ba supply source, a binder, a solvent, and the like. Examples of a supply source of a noble metal element include salts of the noble metal element, and examples of the salt of the noble metal element include nitrates, ammine complex salts, acetates, and chlorides. Examples of the Ba supply source include barium carbonate, barium nitrate, and barium acetate. Examples of the binder include alumina sol, zirconia sol, titanic sol, silica sol, and ceria sol. Examples of the solvent include water and organic solvents.

By adding a Pd salt, the second Zr—Ce based complex oxide, the first Zr—Ce based complex oxide, and a Rh salt in this order to the solvent, Rh can be preferentially supported on the first Zr—Ce based complex oxide, and Pd can be preferentially supported on the second Zr—Ce based complex oxide.

The slurry for forming the first layer 21 is applied to the substrate 10, dried, and calcined, and the slurry for forming the second layer 22 is then applied to the substrate 10, dried, and calcined to form the catalyst layer 20. The slurry can be applied, for example, by dipping the whole substrate 10 in the slurry or by dipping the end on the exhaust gas inflow side or exhaust gas outflow side of the substrate 10 in the slurry and sucking the slurry from the opposite side. The drying temperature is, for example, 50° C. or more and 200° C. or less, the drying time is, for example, 0.1 hours or more and 12 hours or less, the calcining temperature is, for example, 400° C. or more and 700° C. or less, and the calcining time is, for example, 0.5 hours or more and 8 hours or less. Calcining may be performed, for example, in an air atmosphere.

Second Embodiment

An exhaust gas purification catalyst 1B according to a second embodiment of the present invention will be described below with reference to FIG. 5. In the exhaust gas purification catalyst 1B, the same member and portion as those of the exhaust gas purification catalyst 1A are denoted by the same reference signs as those of the exhaust gas purification catalyst 1A. Unless otherwise specified, the above descriptions regarding the exhaust gas purification catalyst 1A also apply to the exhaust gas purification catalyst 13.

As shown in FIG. 5, the exhaust gas purification catalyst 1B differ from the exhaust gas purification catalyst 1A in that:

- the substrate 10 is provided with a first sealing member 14 that seals the ends of some of the cells 13 on the exhaust gas outflow side and a second sealing member 15 that seals the ends of the remaining cells 13 on the exhaust gas inflow side, so that some of the cells 13 are each an inflow-side cell 13*a* in which the end on the exhaust gas inflow side is open and the end on the exhaust gas outflow side is closed by the first sealing member 14, and the remaining cells 13 are each an outflow-side cell 13*b* in which the end on the exhaust gas inflow side is closed by the second sealing member 15 and the end on the exhaust gas outflow side is open; and
- a catalyst layer 30 is provided on the inflow-side cell 13*a* side of the partition wall 12 of the substrate 10, and a catalyst layer 20 is provided on the outflow-side cell 13*b* side of the partition wall 12 of the substrate 10.

As shown in FIG. 5, a plurality of (for example, four) outflow-side cells 13*b* are arranged around and adjacent to one inflow-side cell 13*a*, and the inflow-side cell 13*a* and the outflow-side cells 13*b* adjacent to the inflow-side cell 13*a* are separated from one another by the porous partition wall 12.

As shown in FIG. 5, the catalyst layer 30 extends from the end on the exhaust gas inflow side of the partition wall 12 along the exhaust gas flow direction X, and the catalyst layer 20 extends from the end on the exhaust gas outflow side of the partition wall 12 along the direction opposite to the exhaust gas flow direction X. That is, the catalyst layer 30 is provided on the upstream side of the catalyst layer 20.

In the exhaust gas purification catalyst 1B, the exhaust gas that has flowed in from the end (opening) on the exhaust gas inflow side of the inflow-side cell 13*a* passes through the porous partition wall 12 and flows out from the end (opening) on the exhaust gas outflow side of the outflow-side cell 13*b*. Such a mode is called a wall-flow type.

In the exhaust gas purification catalyst 1B, when the exhaust gas that has flowed in from the end (opening) on the exhaust gas inflow side of the inflow-side cell 13*a* passes through the porous partition wall 12, particulate matter (PM) in the exhaust gas is collected in the pores of the partition wall 12. Therefore, the exhaust gas purification catalyst 1B is useful as a particulate filter for gasoline engines or as a diesel particulate filter for diesel engines.

As shown in FIG. 5, the catalyst layer 20 includes a first layer 21 and a second layer 22. The above descriptions regarding the catalyst layer 20 also apply to the second embodiment.

As shown in FIG. 5, the catalyst layer 30 has a single-layer structure, but may have a laminated structure. The catalyst layer 30 can be configured similarly to known catalyst layers.

In the exhaust gas purification catalyst 1B, the catalyst layer 20 may be provided on the inflow-side cell 13*a* side of the partition wall 12 of the substrate 10, and the catalyst layer 30 may be provided on the outflow-side cell 13*b* side of the partition wall 12 of the substrate 10.

In the exhaust gas purification catalyst 1B, instead of the catalyst layer 30, the catalyst layer 20 may be provided on the inflow-side cell 13*a* side of the partition wall 12 of the substrate 10. That is, the catalyst layer 20 may be provided on both the inflow-side cell 13*a* side and the outflow-side cell 13*b* side of the partition wall 12 of the substrate 10.

EXAMPLES

The following Zr—Ce-based complex oxides (CZ material and ZC material) and lanthanum oxide-modified alumina were prepared.

[CZ Material]

The content of Ce in terms of oxide: 45% by mass, the content of Zr in terms of oxide: 45% by mass, the content of La in terms of oxide: 5% by mass, the content of Nd in terms of oxide: 5% by mass, specific surface area: 70 $m^2/g$

[ZC Material]

The content of Ce in terms of oxide: 20% by mass, the content of Zr in terms of oxide: 70% by mass, the content of Nd in terms of oxide: 10% by mass, specific surface area: 65 $m^2/g$

[Lanthanum Oxide-modified Alumina]

The content of Al in terms of oxide: 99% by mass, the content of La in terms of oxide: 1% by mass, specific surface area: 120 $m^2/g$ In all of the CZ material and ZC material, the oxide of Zr ($ZrO_2$) and the oxide of the rare earth element (Ln) formed a solid solution.

Example A1

(1) Formation of Lower Layer

Palladium nitrate, rhodium nitrate, lanthanum oxide-modified alumina, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 1.

A ceramic honeycomb substrate (diameter: 25.4 mm, length: 40 mm, cells: 600 cells/square inch) was dipped in the slurry for a lower layer, and excess slurry was removed to apply the slurry for a lower layer onto a wall surface inside the substrate. The substrate coated with the slurry for a lower layer was dried at 150° C. for 2.5 hours and then calcined at 500° C. for 2.5 hours to form the lower layer on the wall surface inside the substrate. The amount (washcoat amount) of the lower layer per unit volume of the substrate was 85.7 g/L.

(2) Formation of Upper Layer

Palladium nitrate, a CZ material, a ZC material, rhodium nitrate, and a binder (zirconia sol) were added in this order to a stirring vessel containing pure water, and thoroughly stirred and mixed to obtain a slurry for an upper layer. The composition of the slurry for an upper layer was adjusted so that the composition of the upper layer formed from the slurry for an upper layer was as shown in Table 1.

The substrate having the lower layer formed therein was dipped in the slurry for an upper layer, and excess slurry was removed to apply the slurry for an upper layer onto the lower layer. The substrate coated with the slurry for an upper layer was dried at 150° C. for 2.5 hours and then calcined at 500° C. for 2.5 hours to form the upper layer on the lower layer. The amount (washcoat amount) of the upper layer per unit volume of the substrate was 75.7 g/L.

Example A2

The lower layer was formed on the wall surface inside the substrate in the same manner as in Example A1, except that palladium nitrate, rhodium nitrate, lanthanum oxide-modified alumina, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 1. The amount (washcoat amount) of the lower layer per unit volume of the substrate was 80.7 g/L.

The upper layer was formed on the lower layer in the same manner as in Example A1, except that palladium nitrate, a CZ material, a ZC material, rhodium nitrate, barium acetate, and a binder (zirconia sol) were added in this order to a stirring vessel containing pure water, and thoroughly stirred and mixed to obtain a slurry for an upper layer. The composition of the slurry for an upper layer was adjusted so that the composition of the upper layer formed from the slurry for an upper layer was as shown in Table 1. The amount (washcoat amount) of the upper layer per unit volume of the substrate was 80.7 g/L.

Example A3

The lower layer was formed on the wall surface inside the substrate in the same manner as in Example A1, except that palladium nitrate, rhodium nitrate, lanthanum oxide-modified alumina, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 1, The amount (washcoat amount) of the lower layer per unit volume of the substrate was 81.0 g/L.

The upper layer was formed on the lower layer in the same manner as in Example A1, except that palladium nitrate, a CZ material, a ZC material, rhodium nitrate, barium acetate, and a binder (alumina sol) were added in this order to a stirring vessel containing pure water, and thoroughly stirred and mixed to obtain a slurry for an upper layer. The composition of the slurry for an upper layer was adjusted so that the composition of the upper layer formed from the slurry for an upper layer was as shown in Table 1. The amount (washcoat amount) of the upper layer per unit volume of the substrate was 80.3 g/L.

Example A4

The lower layer was formed on the wall surface inside the substrate in the same manner as in Example A1, except that palladium nitrate, a CZ material, a ZC material, rhodium nitrate, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 1. The amount (washcoat amount) of the lower layer per unit volume of the substrate was 80.3 g/L.

The upper layer was formed on the lower layer in the same manner as in Example A1, except that palladium nitrate, rhodium nitrate, lanthanum oxide-modified alumina, barium acetate, and a binder (alumina sol) were added in this order to a stirring vessel containing pure water, and thoroughly stirred and mixed to obtain a slurry for an upper layer. The composition of the slurry for an upper layer was adjusted so that the composition of the upper layer formed from the slurry for an upper layer was as shown in Table 1. The amount (washcoat amount) of the upper layer per unit volume of the substrate was 81.0 g/L.

Comparative Example A1

The lower layer was formed on the wall surface inside the substrate in the same manner as in Example A1, except that palladium nitrate, lanthanum oxide-modified alumina, a CZ material, a ZC material, rhodium nitrate, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 1. The amount (washcoat amount) of the lower layer per unit volume of the substrate was 161.4 g/L. In Comparative Example A1, no upper layer was formed on the lower layer.

Comparative Example A2

The lower layer was formed on the wall surface inside the substrate in the same manner as in Example A1, except that palladium nitrate, a CZ material, lanthanum oxide-modified alumina, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 1. The amount (washcoat amount) of the lower layer per unit volume of the substrate was 101.2 g/L.

The upper layer was formed on the lower layer in the same manner as in Example A1, except that rhodium nitrate, a ZC material, lanthanum oxide-modified alumina, and a binder (alumina sol) were added in this order to a stirring vessel containing pure water, and thoroughly stirred and mixed to obtain a slurry for an upper layer. The composition of the slurry for an upper layer was adjusted so that the composition of the upper layer formed from the slurry for an upper layer was as shown in Table 1. The amount (washcoat amount) of the upper layer per unit volume of the substrate was 60.2 g/L.

Example B1

The lower layer was formed on the wall surface inside the substrate in the same manner as in Example A1, except that dinitrodiammine platinum, rhodium nitrate, lanthanum oxide-modified alumina, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 2. The amount (washcoat amount) of the lower layer per unit volume of the substrate was 55.4 g/L.

The upper layer was formed on the lower layer in the same manner as in Example A1, except that dinitrodiammine platinum, rhodium nitrate, a CZ material, a ZC material, barium acetate, and a binder (alumina sol) were added in this order to a stirring vessel containing pure water, and thoroughly stirred and mixed to obtain a slurry for an upper layer. The composition of the slurry for an upper layer was adjusted so that the composition of the upper layer formed from the slurry for an upper layer was as shown in Table 2. The amount (washcoat amount) of the upper layer per unit volume of the substrate was 105.4 g/L.

Example B2

The lower layer was formed on the wall surface inside the substrate in the same manner as in Example A1, except that dinitrodiammine platinum, rhodium nitrate, lanthanum oxide-modified alumina, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 2. The amount (washcoat amount) of the lower layer per unit volume of the substrate was 55.6 g/L.

The upper layer was formed on the lower layer in the same manner as in Example A1, except that dinitrodiammine platinum, rhodium nitrate, a CZ material, a ZC material, barium acetate, and a binder (alumina sol) were added in this order to a stirring vessel containing pure water, and thoroughly stirred and mixed to obtain a slurry for an upper layer. The composition of the slurry for an upper layer was adjusted so that the composition of the upper layer formed from the slurry for an upper layer was as shown in Table 2. The amount (washcoat amount) of the upper layer per unit volume of the substrate was 105.2 g/L.

Example B3

The lower layer was formed on the wall surface inside the substrate in the same manner as in Example A1, except that dinitrodiammine platinum, rhodium nitrate, a CZ material, a ZC material, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 2. The amount (washcoat amount) of the lower layer per unit volume of the substrate was 105.2 g/L.

The upper layer was formed on the lower layer in the same manner as in Example A1, except that dinitrodiammine platinum, rhodium nitrate, lanthanum oxide-modified alumina, barium acetate, and a binder (alumina sol) were added in this order to a stirring vessel containing pure water, and thoroughly stirred and mixed to obtain a slurry for an upper layer. The composition of the slurry for an upper layer was adjusted so that the composition of the upper layer formed from the slurry for an upper layer was as shown in Table 2. The amount (washcoat amount) of the upper layer per unit volume of the substrate was 55.6 g/L.

Comparative Example B1

The lower layer was formed on the wall surface inside the substrate in the same manner as in Example A1, except that dinitrodiammine platinum, a CZ material, lanthanum oxide-modified alumina, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 2. The amount (washcoat amount) of the lower layer per unit volume of the substrate was 85.6 g/L.

The upper layer was formed on the lower layer in the same manner as in Example A1, except that rhodium nitrate, a ZC material, lanthanum oxide-modified alumina, and a binder (alumina sol) were added in this order to a stirring vessel containing pure water, and thoroughly stirred and mixed to obtain a slurry for an upper layer. The composition of the slurry for an upper layer was adjusted so that the composition of the upper layer formed from the slurry for an upper layer was as shown in Table 2. The amount (washcoat amount) of the upper layer per unit volume of the substrate was 75.2 g/L.

Comparative Example B2

The lower layer was formed on the wall surface inside the substrate in the same manner as in Example A1, except that dinitrodiammine platinum, rhodium nitrate, a CZ material, a ZC material, lanthanum oxide-modified alumina, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 2. The amount (washcoat amount) of the lower layer per unit volume of the substrate was 160.8 g/L. In Comparative Example B2, no upper layer was formed on the lower layer.

Comparative Example B3

The lower layer was formed on the wall surface inside the substrate in the same manner as in Example A1, except that lanthanum oxide-modified alumina, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 2, The amount (washcoat amount) of the lower layer per unit volume of the substrate was 55.0 g/L.

The upper layer was formed on the lower layer in the same manner as in Example A1, except that dinitrodiammine platinum, rhodium nitrate, a CZ material, a ZC material, lanthanum oxide-modified alumina, barium acetate, and a binder (alumina sol) were added in this order to a stirring vessel containing pure water, and thoroughly stirred and mixed to obtain a slurry for an upper layer. The composition of the slurry for an upper layer was adjusted so that the composition of the upper layer formed from the slurry for an upper layer was as shown in Table 2. The amount of the upper layer per unit volume of the substrate (washcoat amount) was 105.8 g/L.

Comparative Example B4

The lower layer was formed on the wall surface inside the substrate in the same manner as in Example A1, except that dinitrodiammine platinum, rhodium nitrate, lanthanum oxide-modified alumina, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 2. The amount (washcoat amount) of the lower layer per unit volume of the substrate was 55.8 g/L.

The upper layer was formed on the lower layer in the same manner as in Example A1, except that a CZ material, a ZC material, barium acetate, and a binder (alumina sol) were added in this order to a stirring vessel containing pure water, and thoroughly stirred and mixed to obtain a slurry for an upper layer. The composition of the slurry for an upper layer was adjusted so that the composition of the upper layer formed from the slurry for an upper layer was as shown in Table 2. The amount (washcoat amount) of the upper layer per unit volume of the substrate was 105.0 g/L.

Comparative Example B5

The lower layer was formed on the wall surface inside the substrate in the same manner as in Example A1, except that dinitrodiammine platinum, lanthanum oxide-modified alumina, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 2. The amount (washcoat amount) of the lower layer per unit volume of the substrate was 55.6 g/L.

The upper layer was formed on the lower layer in the same manner as in Example A1, except that rhodium nitrate, a CZ material, a ZC material, barium acetate, and a binder (alumina sol) were added in this order to a stirring vessel containing pure water, and thoroughly stirred and mixed to obtain a slurry for an upper layer. The composition of the slurry for an upper layer was adjusted so that the composition of the upper layer formed from the slurry for an upper layer was as shown in Table 2. The amount (washcoat amount) of the upper layer per unit volume of the substrate was 105.2 g/L.

Comparative Example B6

The lower layer was formed on the wall surface inside the substrate in the same manner as in Example A1, except that rhodium nitrate, lanthanum oxide-modified alumina, barium acetate, and a binder (alumina sol) were added in this order to a stirring vessel containing pure water, and thoroughly stirred and mixed to obtain a slurry for a lower layer. The composition of the slurry for a lower layer was adjusted so that the composition of the lower layer formed from the slurry for a lower layer was as shown in Table 2, The amount (washcoat amount) of the lower layer per unit volume of the substrate was 55.2 g/L.

The upper layer was formed on the lower layer in the same manner as in Example A1, except that dinitrodiammine platinum, a CZ material, a ZC material, barium acetate, and a binder (alumina sol) were added in this order to a stirring vessel containing pure water, and thoroughly stirred and mixed to obtain a slurry for an upper layer. The composition of the slurry for an upper layer was adjusted so that the composition of the upper layer formed from the slurry for an upper layer was as shown in Table 2, The amount (washcoat amount) of the upper layer per unit volume of the substrate was 105.6 g/L.

The exhaust gas purification catalysts of Examples A1 to A4, Comparative Examples A1 to A2, Examples B1 to B3 and Comparative Examples 31 to 136 were obtained as described above.

The content of Pd in terms of metal (% by mass), the content of Rh in terms of metal (% by mass), the total of the content of Pd in terms of metal and the content of Rh in terms of metal (% by mass), the content of Al in terms of oxide (% by mass), and the total of the content of Zr in terms of oxide and the content of Ce in terms of oxide (% by mass) in each layer of the exhaust gas purification catalysts of Examples A1 to A4 and Comparative Examples A1 to A2 are shown in Table 3, and the content of Pt in terms of metal (% by mass), the content of Rh in terms of metal (% by mass), the total of the content of Pt in terms of metal and the content of Rh in terms of metal (% by mass), the content of Al in terms of oxide (% by mass), and the total of the content of Zr in terms of oxide and the content of Ce in terms of oxide (% by mass) in each layer of the exhaust gas purification catalysts of Examples B1 to 33 and Comparative Examples 31 to B6 are shown in Table 4. In Tables 1 to 4, in the type of the layer, "A" means a layer in which the content of Al in terms of oxide is 75% by mass or more and the total of the content of Zr in terms of oxide and the content of Ce in terms of oxide is 15% by mass or less, "B" means a layer in which the total of the content of Zr in terms of oxide and the content of Ce in terms of oxide is 70% by mass or more and the content of Al in terms of oxide is 15% by mass or less, and "C" means a layer that does not correspond to either "A" or "B".

TABLE 1

| | | | Amount per Unit Volume of Substrate (g/L) | | | | | | | | |
|---|---|---|---|---|---|---|---|---|---|---|---|
| | | Type of Layer | Pd | Rh | Lanthanum Oxide-modified Alumina | CZ Material | ZC Material | Barium Carbonate | Alumina Binder | Zirconia Binder | Total |
| Example A1 | Lower Layer | A | 0.60 | 0.080 | 67 | — | — | 10 | 8 | — | 85.7 |
| | Upper Layer | B | 0.60 | 0.080 | — | 40 | 27 | — | — | 8 | 75.7 |
| Example A2 | Lower Layer | A | 0.60 | 0.080 | 67 | — | — | 5 | 8 | — | 80.7 |
| | Upper Layer | B | 0.60 | 0.080 | — | 40 | 27 | 5 | — | 8 | 80.7 |
| Example A3 | Lower Layer | A | 0.90 | 0.12 | 67 | — | — | 5 | 8 | — | 81.0 |
| | Upper Layer | B | 0.30 | 0.040 | — | 40 | 27 | 5 | 8 | — | 80.3 |
| Example A4 | Lower Layer | B | 0.30 | 0.040 | — | 40 | 27 | 5 | 8 | — | 80.3 |
| | Upper Layer | A | 0.90 | 0.12 | 67 | — | — | 5 | 8 | — | 81.0 |
| Comparative | Lower Layer | C | 1.2 | 0.16 | 67 | 40 | 27 | 10 | 16 | — | 161.4 |
| Example A1 | Upper Layer | C | — | — | — | — | — | — | — | — | — |
| Comparative | Lower Layer | C | 1.2 | — | 40 | 40 | — | 10 | 10 | — | 101.2 |
| Example A2 | Upper Layer | C | — | 0.16 | 27 | 27 | — | — | 6 | — | 60.2 |

TABLE 2

| | | | Amount per Unit Volume of Substrate (g/L) | | | | | | | |
|---|---|---|---|---|---|---|---|---|---|---|
| | | Type of Layer | Pt | Rh | Lanthanum Oxide-modified Alumina | CZ Material | ZC Material | Barium Carbonate | Alumina Binder | Total |
| Example B1 | Lower Layer | A | 0.30 | 0.080 | 46 | — | — | 5 | 4 | 55.4 |
| | Upper Layer | B | 0.30 | 0.080 | — | 46 | 46 | 5 | 8 | 105.4 |
| Example B2 | Lower Layer | A | 0.45 | 0.12 | 46 | — | — | 5 | 4 | 55.6 |
| | Upper Layer | B | 0.15 | 0.040 | — | 46 | 46 | 5 | 8 | 105.2 |
| Example B3 | Lower Layer | B | 0.15 | 0.040 | — | 46 | 46 | 5 | 8 | 105.2 |
| | Upper Layer | A | 0.45 | 0.12 | 46 | — | — | 5 | 4 | 55.6 |
| Comparative | Lower Layer | C | 0.60 | — | 23 | — | 46 | 10 | 6 | 85.6 |
| Example B1 | Upper Layer | C | — | 0.16 | 23 | — | 46 | — | 6 | 75.2 |
| Comparative | Lower Layer | C | 0.60 | 0.16 | 46 | 46 | 46 | 10 | 12 | 160.8 |
| Example B2 | Upper Layer | C | — | — | — | — | — | — | — | — |
| Comparative | Lower Layer | A | — | — | 46 | — | — | 5 | 4 | 55.0 |
| Example B3 | Upper Layer | B | 0.60 | 0.16 | — | 46 | 46 | 5 | 8 | 105.8 |
| Comparative | Lower Layer | A | 0.60 | 0.16 | 46 | — | — | 5 | 4 | 55.8 |
| Example B4 | Upper Layer | B | — | — | — | 46 | 46 | 5 | 8 | 105.0 |

TABLE 2-continued

| | | Type of Layer | Amount per Unit Volume of Substrate (g/L) Pt | Rh | Lanthanum Oxide-modified Alumina | CZ Material | ZC Material | Barium Carbonate | Alumina Binder | Total |
|---|---|---|---|---|---|---|---|---|---|---|
| Comparative | Lower Layer | A | 0.60 | — | 46 | — | — | 5 | 4 | 55.6 |
| Example B5 | Upper Layer | B | — | 0.16 | — | 46 | 46 | 5 | 8 | 105.2 |
| Comparative | Lower Layer | A | — | 0.16 | 46 | — | — | 5 | 4 | 55.2 |
| Example B6 | Upper Layer | B | 0.60 | — | — | 46 | 46 | 5 | 8 | 105.6 |

TABLE 3

(unit: % by mass)

| | | Type of Layer | Content of Pd in terms of Metal | Content of Rh in terms of Metal | Total Content of Pd and Rh in terms of Metal | Content of Al in terms of Oxide | Total Content of Zr and Ce in terms of Oxide |
|---|---|---|---|---|---|---|---|
| Example A1 | Lower Layer | A | 0.70 | 0.09 | 0.79 | 86.7 | — |
| | Upper Layer | B | 0.79 | 0.11 | 0.90 | — | 90.2 |
| Example A2 | Lower Layer | A | 0.74 | 0.10 | 0.84 | 92.1 | — |
| | Upper Layer | B | 0.74 | 0.10 | 0.84 | — | 84.6 |
| Example A3 | Lower Layer | A | 1.11 | 0.15 | 1.26 | 91.8 | — |
| | Upper Layer | B | 0.37 | 0.05 | 0.42 | 10.0 | 75.1 |
| Example A4 | Lower Layer | B | 0.37 | 0.05 | 0.42 | 10.0 | 75.1 |
| | Upper Layer | A | 1.11 | 0.15 | 1.26 | 91.8 | — |
| Comparative | Lower Layer | C | 0.74 | 0.10 | 0.84 | 51.0 | 37.4 |
| Example A1 | Upper Layer | C | — | — | — | — | — |
| Comparative | Lower Layer | C | 1.19 | — | 1.19 | 49.0 | 35.6 |
| Example A2 | Upper Layer | C | — | 0.27 | 0.27 | 54.4 | 40.4 |

TABLE 4

(unit: % by mass)

| | | Type of Layer | Content of Pd in terms of Metal | Content of Rh in terms of Metal | Total Content of Pd and Rh in terms of Metal | Content of Al in terms of Oxide | Total Content of Zr and Ce in terms of Oxide |
|---|---|---|---|---|---|---|---|
| Example B1 | Lower Layer | A | 0.54 | 0.14 | 0.69 | 89.4 | — |
| | Upper Layer | B | 0.28 | 0.08 | 0.36 | 7.6 | 78.6 |
| Example B2 | Lower Layer | A | 0.81 | 0.22 | 1.03 | 89.1 | — |
| | Upper Layer | B | 0.14 | 0.04 | 0.18 | 7.6 | 78.7 |
| Example B3 | Lower Layer | B | 0.14 | 0.04 | 0.18 | 7.6 | 78.7 |
| | Upper Layer | A | 0.81 | 0.22 | 1.03 | 89.1 | — |
| Comparative | Lower Layer | C | 0.70 | — | 0.70 | 33.6 | 48.4 |
| Example B1 | Upper Layer | C | — | 0.21 | 0.21 | 38.3 | 55.1 |
| Comparative | Lower Layer | C | 0.37 | 0.10 | 0.47 | 35.8 | 51.5 |
| Example B2 | Upper Layer | C | — | — | — | — | — |
| Comparative | Lower Layer | A | — | — | — | 90.1 | — |
| Example B3 | Upper Layer | B | 0.57 | 0.15 | 0.72 | 7.6 | 78.3 |
| Comparative | Lower Layer | A | 1.08 | 0.29 | 1.37 | 88.8 | — |
| Example B4 | Upper Layer | B | — | — | — | 7.6 | 78.9 |
| Comparative | Lower Layer | A | 1.08 | — | 1.08 | 89.1 | — |
| Example B5 | Upper Layer | B | — | 0.15 | 0.15 | 7.6 | 78.7 |
| Comparative | Lower Layer | A | — | 0.29 | 0.29 | 89.7 | — |
| Example B6 | Upper Layer | B | 0.57 | — | 0.57 | 7.6 | 78.4 |

<Exhaust Gas Purification Performance Test>

After each of the exhaust gas purification catalysts of Examples A1 to A4, Comparative Examples A1 to A2, Examples 31 to 33 and Comparative Examples 31 to B6 was subjected to aging treatment, the exhaust gas purification performance was evaluated as follows. The aging treatment was performed by heat treatment at 1000° C. for 30 hours under a circulating atmosphere containing 0.50% of $O_2$ gas, 10% of water vapor, and $N_2$ as balance gas.

A model gas having the following composition with an A F of 14.6 was circulated through the exhaust gas purification catalyst (catalyst volume 15 mL) after aging treatment at 25 L/min while adjusting the CO concentration and $O_2$ concentration so that the A/F varied in the range of 14.4 to 14.8. The temperature of the gas flowing into the exhaust gas purification catalyst was gradually increased from room temperature at a predetermined temperature-increasing rate, and the amount of HC contained in the exhaust gas that passed through the catalyst was determined by the following equipment to obtain the purifying rate based on the following formula, X represents the amount detected when the catalyst was not provided, and Y represents the amount detected after the catalyst was provided.

$$\text{Purifying rate } (\%)=(X-Y)/X\times 100$$

The inlet gas temperature of the catalyst when the purifying rate reached 50%, namely light-off temperature T50, was obtained. The measurement of T50 was carried out while the temperature was being raised. The results are shown in Table 5.

[Composition of Model Gas (by Volume)]

CO: 0.3%, $C_3H_6$: 1000 ppmC, NO: 500 ppm, $O_2$: 0.28%, $CO_2$: 14%, $H_2O$: 10%, $N_2$: the balance

[Temperature-increasing rate] 10° C./min

[Evaluation equipment] MOTOR EXHAUST GAS ANALYZER MEXA7100 manufactured by HORIBA, Ltd.

As shown in Table 5, the exhaust gas purification catalysts of Examples A1 to A4 exhibited higher exhaust gas purification performances after the aging treatment than the exhaust gas purification catalysts of Comparative Examples A1 to A2, and the exhaust gas purification catalysts of Examples B1 to B3 exhibited higher exhaust gas purification performances after the aging treatment than the exhaust gas purification catalysts of Comparative Examples B1 to 36.

TABLE 5

| | T50(° C.) |
|---|---|
| Example A1 | 299 |
| Example A2 | 309 |
| Example A3 | 304 |
| Example A4 | 304 |
| Comparative Example A1 | 310 |
| Comparative Example A2 | 311 |
| Example B1 | 314 |
| Example B2 | 307 |
| Example B3 | 302 |
| Comparative Example B1 | 315 |
| Comparative Example B2 | 320 |
| Comparative Example B3 | 318 |
| Comparative Example B4 | 325 |
| Comparative Example B5 | 319 |
| Comparative Example B6 | 318 |

DESCRIPTION OF SYMBOLS

1A, 1B Exhaust Gas Purification Catalyst

10 Substrate

20 Catalyst Layer

21 First Layer

22 Second Layer

The invention claimed is:

1. An exhaust gas purification catalyst comprising:

a substrate; and a catalyst layer provided on the substrate, wherein the catalyst layer comprises:

a first layer comprising a first platinum group element and a complex oxide containing zirconium element and cerium element; and a second layer comprising a second platinum group element and an oxide containing aluminum element, wherein the first platinum group element and the second platinum group element each contain rhodium element, and palladium element and/or platinum element;

wherein, in the first layer, a total of a content of zirconium element in terms of oxide and a content of cerium element in terms of oxide, and a content of aluminum element in terms of oxide are 70% by mass or more and 15% by mass or less, respectively, based on a mass of the first layer;

wherein, in the second layer, a content of aluminum element in terms of oxide, and a total of a content of zirconium element in terms of oxide and a content of cerium element in terms of oxide are 75% by mass or more and 15% by mass or less, respectively, based on a mass of the second layer;

wherein the complex oxide in the first layer contains a first complex oxide and a second complex oxide; and wherein a content of the cerium element in terms of oxide in the second complex oxide is higher than a content of the cerium element in terms of oxide in the first complex oxide.

2. The exhaust gas purification catalyst according to claim 1, wherein the first layer is substantially free of barium element and an oxide containing aluminum element.

3. The exhaust gas purification catalyst according to claim 1, wherein a total content of the second platinum group element in the second layer is higher than a total content of the first platinum group element in the first layer.

4. The exhaust gas purification catalyst according to claim 1, wherein the first layer is located between the substrate and the second layer.

5. The exhaust gas purification catalyst according to claim 1, wherein the first platinum group element contains rhodium element and palladium element, and wherein, among the first platinum group element, rhodium element is supported on the first complex oxide, and palladium element is supported on the second complex oxide.

6. The exhaust gas purification catalyst according to claim 1, wherein the catalyst layer consists of the first layer and the second layer.

7. The exhaust gas purification catalyst according to claim 1, wherein a mass ratio of a total amount of palladium element and platinum element to an amount of rhodium element in the first layer, and a mass ratio of a total amount of palladium element and platinum element to an amount of rhodium element in the second layer are each 1 or more and less than 10.

* * * * *